(12) United States Patent
Lallukka et al.

(10) Patent No.: US 6,647,110 B2
(45) Date of Patent: Nov. 11, 2003

(54) METHOD AND SYSTEM FOR RECONFIGURATION OF AN INTERFACE

(75) Inventors: Toivo Lallukka, Oulu (FI); Mika Haapea, Kiiminki (FI); Arto Rukajärvi, Oulunsalo (FI)

(73) Assignee: Nokia Corporation, Espoo (FI)

( * ) Notice: Subject to any disclaimer, the term of this patent is extended or adjusted under 35 U.S.C. 154(b) by 137 days.

(21) Appl. No.: 10/000,909

(22) Filed: Nov. 30, 2001

(65) Prior Publication Data

US 2002/0097712 A1 Jul. 25, 2002

Related U.S. Application Data

(63) Continuation of application No. PCT/FI00/00484, filed on May 30, 2000.

(30) Foreign Application Priority Data

Jun. 2, 1999 (FI) .................................................. 991258

(51) Int. Cl.$^7$ ................................................ H04M 7/00
(52) U.S. Cl. ................................. 379/219; 379/221.06
(58) Field of Search ............................ 379/219, 220.01, 379/221.01, 221.03, 221.06; 370/359

(56) References Cited

FOREIGN PATENT DOCUMENTS

| EP | 0 624 992 | 11/1994 | | |
|---|---|---|---|---|
| GB | 2 337 177 | 11/1999 | | |
| WO | 98/41037 | 9/1998 | | |
| WO | 98/42148 | 9/1998 | | |
| WO | WO-9931896 A | * | 6/1999 | ............ H04Q/3/00 |
| WO | WO-9948307 A | * | 9/1999 | ............ H04Q/3/00 |
| WO | 99/53715 | 10/1999 | | |

OTHER PUBLICATIONS

ETS 300 324–1, "Signalling Protocols and Switching (SPS); V interfaces at the digital Local Exchange (LE) V5.1 interface for the support of Access Network (AN) Part 1: V5.1 interface specification", *European Telecommunications Standards Institute*, pp. 1–274 (Feb. 1994).

ETS 300–324–1 A1, "Signalling Protocols and Switching (SPS); V interfaces at the digital Local Exchange (LE); V5.1 interface for the support of Access Network (AN); Part 1: V5.1 interface specification", *European Telecommunications Standards Institute*, pp. 1–46 (Jan. 1996).

International Search Report for PCT/FI00/00484.

* cited by examiner

*Primary Examiner*—Benny Tieu
(74) *Attorney, Agent, or Firm*—Squire, Sanders & Dempsey L.L.P.

(57) ABSTRACT

The invention concerns a method and a system for redefinition of the configuration of an interface in a telecommunication system comprising a local exchange, and access node, subscriber ports comprised in said network elements and an interface connecting the subscriber ports of the first network element to the subscriber ports of the second network element. In the method, free subscriber ports are blocked and the configuration of the interface is redefined after all the subscriber ports have been blocked. According to the invention, a connection established or being established via the subscriber port is disconnected before the port is blocked. The system of the invention comprises means for disconnecting a connection established or being established via the subscriber port.

8 Claims, 2 Drawing Sheets

METHOD AND SYSTEM FOR RECONFIGURATION OF AN INTERFACE

Figure 1:
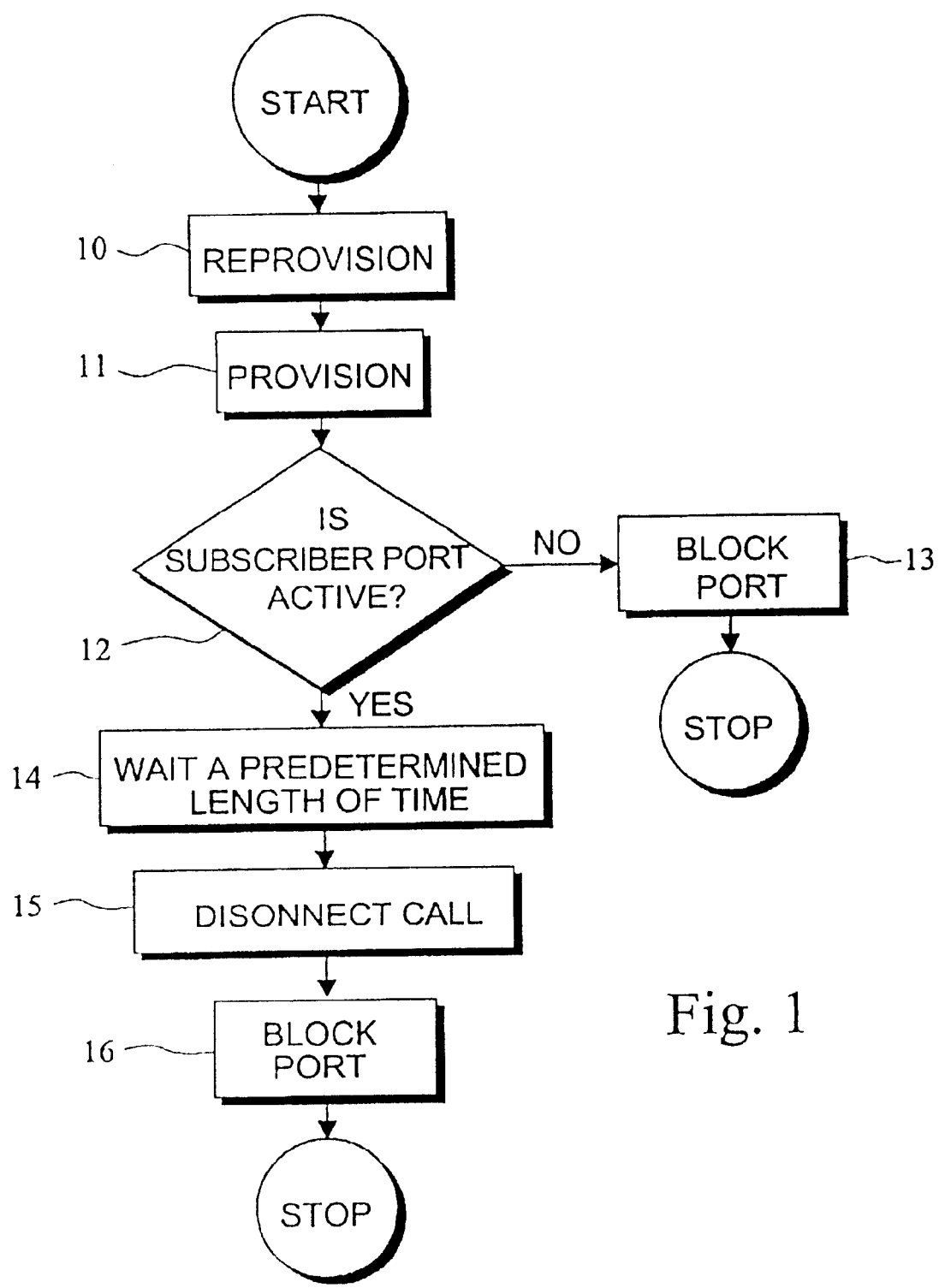

This application is a continuation of PCT/FI00/00484 filed on May 30, 2000.

The present invention relates to telecommunication systems. The invention concerns a method and system for redefining the configuration of an interface between two network elements.

BACKGROUND OF THE INVENTION

Two network elements, such as an access node and a local exchange, can be connected to each other using e.g. the V5.1 or V5.2 protocol. Open interfaces (V5.1 and V5.2) between an access node and a telephone exchange are defined in the ETSI (European Telecommunications and Standards Institute) standards. V5 interfaces enable subscribers belonging to a physically separate access network, which may be a wired or a wireless network, to be connected using the standard interface of the telephone exchange. A dynamic concentrator interface 5.2 consists of one or more (1–16) PCM (Pulse Code Modulation) lines. One PCM line comprises 32 channels or time slots, each of which has a transfer rate of 64 kbit/s, so the total capacity of the PCM line is 2048 kbit/s. The V5.2 interface supports analog telephones as used in the public telephone network, digital, such as ISDN (Integrated Services Digital Network) basic rate and primary rate interfaces as well as other analog or digital terminal equipment based on semi-fixed circuits.

The standards concerning the V5 interface define two different ways of changing the specifications of a V5 interface already in operation. Changing the specifications means e.g. removing a signalling channel to a different time slot or adding new signalling channels. Such changes can be made by using the so-called reprovision function defined in the standard, whereby the changed specifications are given a new "designation" (provisioning variant) in both network elements, i.e. in the local exchange and the access node, and a check is carried out to make sure that both parties are ready for the change. The provisioning variant is a parameter which is checked in conjunction with the start-up of the V5 interface. This parameter is given numeric values corresponding to certain predetermined configurations of the V5 interface. However, changes can be made in the V5 interface even without using the reprovision function. In this case, the changes are made independently at both ends without changing the value of the provisioning variant parameter. When the changes are activated, the changes specified are made automatically at both ends and the interface is started up.

The configuration of a V5 interface connecting two network elements can be changed as necessary, e.g. by introducing new links or signalling channels. The network elements verify their readiness for the change of configuration by exchanging messages. Before a change can be made, all subscriber ports in the interface have to be blocked. A new signalling channel can not be introduced if the corresponding time slot is occupied by an active connection, e.g. a call going on.

In prior-art technology, e.g. as defined in the ETS 300 342-1 standard, February 1994, section 7.2.2., when the configuration is to be changed, the subscriber ports are blocked without disturbing connections that are currently active or in the process of being established. Free subscriber ports are blocked immediately, and busy ports upon termination of the calls. The blocked subscriber ports cannot set up any connections before the blockage has been removed.

The problem in the above-described situation is that even a single connection of long duration, such as an Internet connection, may occasion a long break in telephone communication for a large number of subscribers.

The object of the present invention is to eliminate the problem referred to above or at least to significantly alleviate it. A further object of the invention is to disclose a new type of method and system that will allow the configuration of an interface between network elements to be redefined without causing major difficulties to any particular subscriber group.

BRIEF DESCRIPTION OF THE INVENTION

The invention concerns a method for redefining the configuration of an interface in a telecommunication system comprising a first and a second network element, subscriber ports comprised in the network elements and an interface connecting the subscriber ports of the first and the second network elements to each other. The interface is preferably a V5 interface. In the method, free subscriber ports are blocked and the configuration of the interface is redefined after all subscriber ports have been blocked. According to the invention, a connection established or being established by a subscriber port is disconnected, thus releasing the subscriber port. The released subscriber ports can then be blocked immediately.

In an embodiment, the connection of a subscriber port is disconnected after the lapse of a predetermined length of time. In this case, it is possible to define a kind of buffer time, in the course of which a suitable proportion of the subscribers are likely to terminate their connections. Within the buffer time, for those subscribers who have no active connection or who break a connection during it, the subscriber port can be blocked. Thus, blocking the subscriber ports will only produce a disturbance for those subscribers who are having a connection of a duration longer than the specified buffer time or who try to set up a new connection during the buffer time.

In an embodiment of the method, to reconfigure the interface, the provisioning variant parameter for the interface defined in the V5 specifications is modified. Provisioning variant is one of the parameters that are verified in conjunction with the startup of the V5 interface. This verification is carried out to make sure that the local exchange and the access node observe the same configuration in the V5 interface. Configuration refers in the first place to the position and order of the signalling channels. When the parameter is given a new value, this means that e.g. the signalling channels use another time slot. Before the changes are activated at both ends, i.e. before the interface is started up, the appropriate devices first check via signalling that the new value of the provisioning variant parameter is known at both ends, whereupon the configuration changes required by this parameter are made independently.

The invention also concerns a system for redefinition of the configuration of an interface in a telecommunication system as described above. The system of the invention comprises means for disconnecting an existing connection or a connection being established via a subscriber port before blocking the port. In an embodiment of the invention, the system comprises means for disconnecting the connection of a subscriber port after the lapse of a predetermined length of time. The interface is preferably a V5 interface. In an embodiment, the system comprises means for redefining the configuration of the interface by modifying the provisioning variant parameter for the V5 interface defined in the V5 specifications.

The invention provides the advantage of minimizing the time consumed in effecting a configuration change. Normal telephone traffic is made possible for all subscribers without any long waiting times. Thus, the service received by subscribers connected to an access node via a concentrating link is improved. In practice, this means that, in conditions of crisis and similar circumstances when it is absolutely necessary to be able to set up a call, the probability of successful setup of a priority call can be improved. In addition, the invention is applicable to both terminating and outgoing calls and is therefore very useful.

The invention is also particularly useful when both the local exchange and the access node consist of equipment manufactured by the applicant, e.g. when the local exchange is a DX200 switching center and the access node is a DAXnode5000.

LIST OF ILLUSTRATIONS

Figure 2:
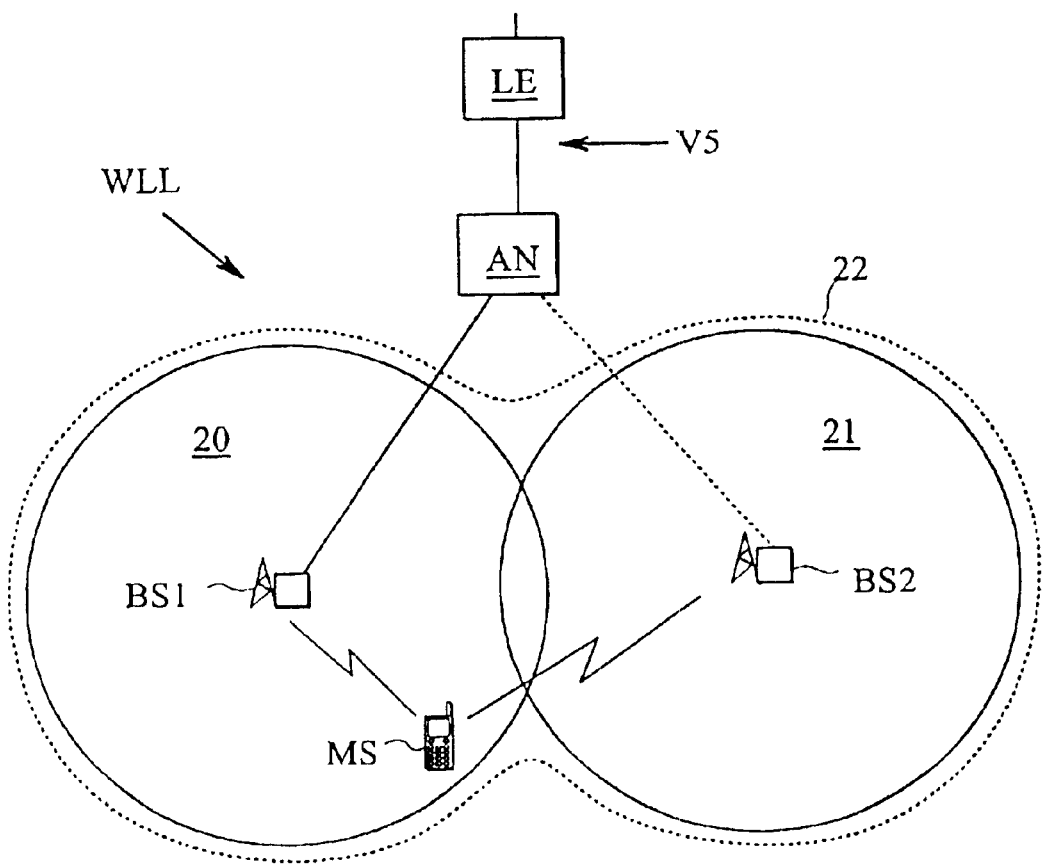
Figure 3:
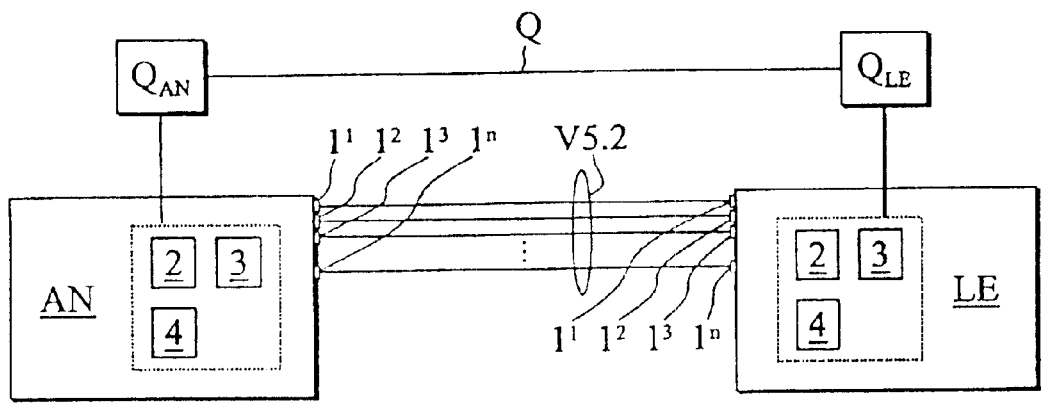

In the following, the invention will be described by the aid of a few examples of its embodiments with reference to the attached drawing, wherein FIG. 1 presents a block diagram representing an embodiment of the method of the invention,;

FIG. 2 presents a diagram representing a telecommunication system in which the invention can be applied; and FIG. 3 presents a diagram representing a system according to the invention.

DETAILED DESCRIPTION OF THE INVENTION

The flow diagram in FIG. 1 presents the various steps comprised in the method of the invention. At step 10, a reprovision function is performed, which is done to make sure that both ends of the interface are ready for the change. This is followed by a provision function, step 11, which starts the actual changing of the configuration. Before the change can be made, all subscriber ports have to blocked. At step 12, the state of one subscriber port at a time is checked; this check can be carried out on all the subscriber ports simultaneously or in a suitable sequence. If the subscriber port is not active, in other words, if there is currently no active connection or call and none is being set up via the subscriber port, then the next step after step 12 is step 13, where the subscriber port is blocked immediately. The port will remain blocked until the reconfiguration of the interface has been completed. If the subscriber port is active, then the procedure will go on from step 12 to step 14. At step 14, the system waits a predetermined length of time, i.e. buffer time, for termination of the connection. If the connection is broken off within the buffer time, then the procedure will go on to step 16, where the subscriber port is blocked immediately. After the lapse of the buffer time, the procedure goes on to step 15, where the connection of the subscriber port is disconnected. The same buffer time is applied to all active subscriber ports, which means that, at the latest after the buffer time has elapsed, all subscriber ports are blocked simultaneously.

FIG. 2 depicts a telecommunication system in which the invention can be applied. In a WLL system (WLL, Wireless Local Loop), a telecommunication terminal MS has been connected via the WLL system to an access node AN, which in one embodiment is a DAXnode 5000 manufactured by Nokia. The wireless local loop system WLL comprises at least one base station BS, which is connected via an Abis interface to the access node AN; in this example, there are two base stations BS1 and BS2, forming cell areas 20 and 21. The access node AN controls the operation of the base stations BS. The cell areas 21 and 21 together form a mobility area 22, which is the operating area defined for the telecommunication terminal MS in this example. The access node AN is connected via a V5 interface to a local exchange LE, which sees the telecommunication terminal MS in the WLL system as a normal wired-network subscriber. In one embodiment, the local exchange LE is a DX220 manufactured by Nokia. The subscriber may also be a wired-network subscriber.

FIG. 3 is a diagrammatic representation of a system according to the invention. An access node AN is connected to a local exchange LE via a V5.2 interface; in one embodiment, the network elements LE, AN are connected via a V5.1 interface. Each network element LE, AN comprises subscriber ports $1^1, 1^2, 1^3, \ldots, 1^n$. The subscriber ports 1 in the two network elements are connected to each other via a V5 interface. The access node AN is provided with a management interface $Q_{AN}$ and the local exchange LE is provided with a management interface $Q_{LE}$, allowing the network elements AN, LE to be controlled via the management interfaces $Q_{LE}$, $Q_{AN}$. The boundaries between and structures of the management interfaces are defined in the standards.

Using means 2, a connection existing or being set up at the subscriber port 1 is disconnected in the access node AN and local exchange LE. Using means 3, the connection of the subscriber port is disconnected after the lapse of a predetermined length of time. Using means 4, the configuration of the interface is redefined by modifying the provisioning variant parameter.

In the case of the example, means 2–4 are implemented both in the access node AN and in the local exchange LE and connected to an administrative interface Q via the management interfaces $Q_{LE}$ and $Q_{AN}$. The messages to be exchanged in the reconfiguration procedure are transmitted e.g. via the administrative interface Q. The communication between the access node AN and the local exchange LE can also be implemented in other ways, e.g. via the signalling channels of the V5 interface. Certain time slots in the V5 interface form a so-called C-channel, which carries messages of the protocols used to control the interface itself and the calls transmitted in it. The C-channel or the 64 kbit/s time slot reserved for this purpose is used for the transmission of information which may belong to the Control protocol, Link protocol, Protection protocol or BCC protocol of the V5 interface or which may consist of PSTN signalling or ISDN data. In an embodiment, the changing of the configuration of the interface is started via the Q interface, in which case the operator of the system gives the access node AN and local exchange LE a command for starting the configuration change, after which the network elements perform their mutual signalling using the V5 interface signalling channels.

Means 2–4 can be implemented via software, so they can also be easily implemented in distributed form in the management system. Means 2–4 can also be implemented as separate components, programmable logic circuits or ASIC circuits (ASIC, Application Specific Integrated Circuit).

The invention is not restricted to the examples of its embodiments described above, but many variations are possible within the scope of the inventive idea defined in the claims.

What is claimed is:

1. Method for redefinition of the configuration of an interface in a telecommunication system comprising:
   a first network element;
   a second network element;
   subscriber ports comprised in the network elements; and
   an interface connecting the subscriber ports of the first network element to the subscriber ports of the second network element, in which method;
   free subscriber ports are blocked; and
   the configuration of the interface is redefined after all the subscriber ports have been blocked, wherein disconnecting a connection established or being established via the subscriber port before the port is blocked.

2. Method as defined in claim 1 wherein the connection of the subscriber port is disconnected after the lapse of a predetermined length of time.

3. Method as defined in claim 1 wherein the interface is a V5 interface.

4. Method as defined in claim 1, wherein, for redefinition of the configuration of the interface, the provisioning variant parameter for the interface as defined in the V5 specifications is modified.

5. System for redefinition of the configuration of an interface in a telecommunication system comprising:
   a first network element;
   a second network element;
   subscriber ports comprised in the network elements; and
   an interface connecting the subscriber ports of the first network element to the subscriber ports of the second network element, in which system;
   free subscriber ports are blocked; and
   the configuration of the interface is redefined after all the subscriber ports have been blocked, wherein the system comprises means for disconnecting a connection established or being established via the subscriber port before the port is blocked.

6. System as defined in claim 3, wherein the system comprises means for disconnecting the connection of the subscriber port after the lapse of a predetermined length of time.

7. System as defined in claim 5 wherein the interface is a V5 interface.

8. System as defined in claim 5, wherein the system comprises means for redefining the configuration of the interface by modifying the provisioning variant parameter for the interface as defined in the V5 specifications.

* * * * *